United States Patent [19]
DeLand et al.

[11] Patent Number: 5,941,218
[45] Date of Patent: Aug. 24, 1999

[54] WELDED CONSTRUCTION FOR FUEL VAPOR PURGE REGULATOR VALVE ASSEMBLY

[75] Inventors: Daniel L. DeLand, Davison; Charles A. Detweiler, Durand; Gerrit V. Beneker, Algonac, all of Mich.

[73] Assignee: Eaton Corporation, Cleveland, Ohio

[21] Appl. No.: 09/045,781

[22] Filed: Mar. 20, 1998

[51] Int. Cl.$^6$ .................................................. F02M 37/04
[52] U.S. Cl. ............................................ 123/520; 137/859
[58] Field of Search ............................... 123/516, 520; 251/331; 137/503, 613, 859

[56] References Cited

U.S. PATENT DOCUMENTS

| | | | |
|---|---|---|---|
| 5,069,188 | 12/1991 | Cook | 123/520 |
| 5,083,546 | 1/1992 | Detweiler et al. | 123/520 |
| 5,115,785 | 5/1992 | Cook | 123/520 |
| 5,226,446 | 7/1993 | Cooper | 137/859 |
| 5,277,167 | 1/1994 | DeLand et al. | 123/518 |
| 5,388,615 | 2/1995 | Edlumd et al. | 137/859 |
| 5,448,981 | 9/1995 | Cook et al. | 123/520 |

*Primary Examiner*—Thomas N. Moulis
*Attorney, Agent, or Firm*—Roger A. Johnston

[57] ABSTRACT

An electrically controlled fuel vapor canister purge pressure regulator valve assembly has the regulator valve housing formed integrally with the solenoid operated valve body. A pressure responsive diaphragm is disposed in the housing to form on opposite sides thereof, an inlet chamber and an outlet chamber. The valve body has an inlet passage communicating with the inlet chamber and an outlet passage communicating with the outlet passage. The solenoid controls by-pass flow around the diaphragm to the outlet chamber. The outlet passage is closed by a closure member defining an outlet passage and valve seat. The diaphragm has a plate thereon moveable with the diaphragm to control flow over the valve seat. The outlet closure member encloses the diaphragm periphery and is sealed to the housing by a weld ring which may be spin friction or ultrasonically welded to the housing. An inlet chamber closure member forms an inlet fitting and inlet passage and retains a filter in the inlet chamber. The inlet closure member is sealed to the housing by a weld ring similar to the outlet closure member.

9 Claims, 1 Drawing Sheet

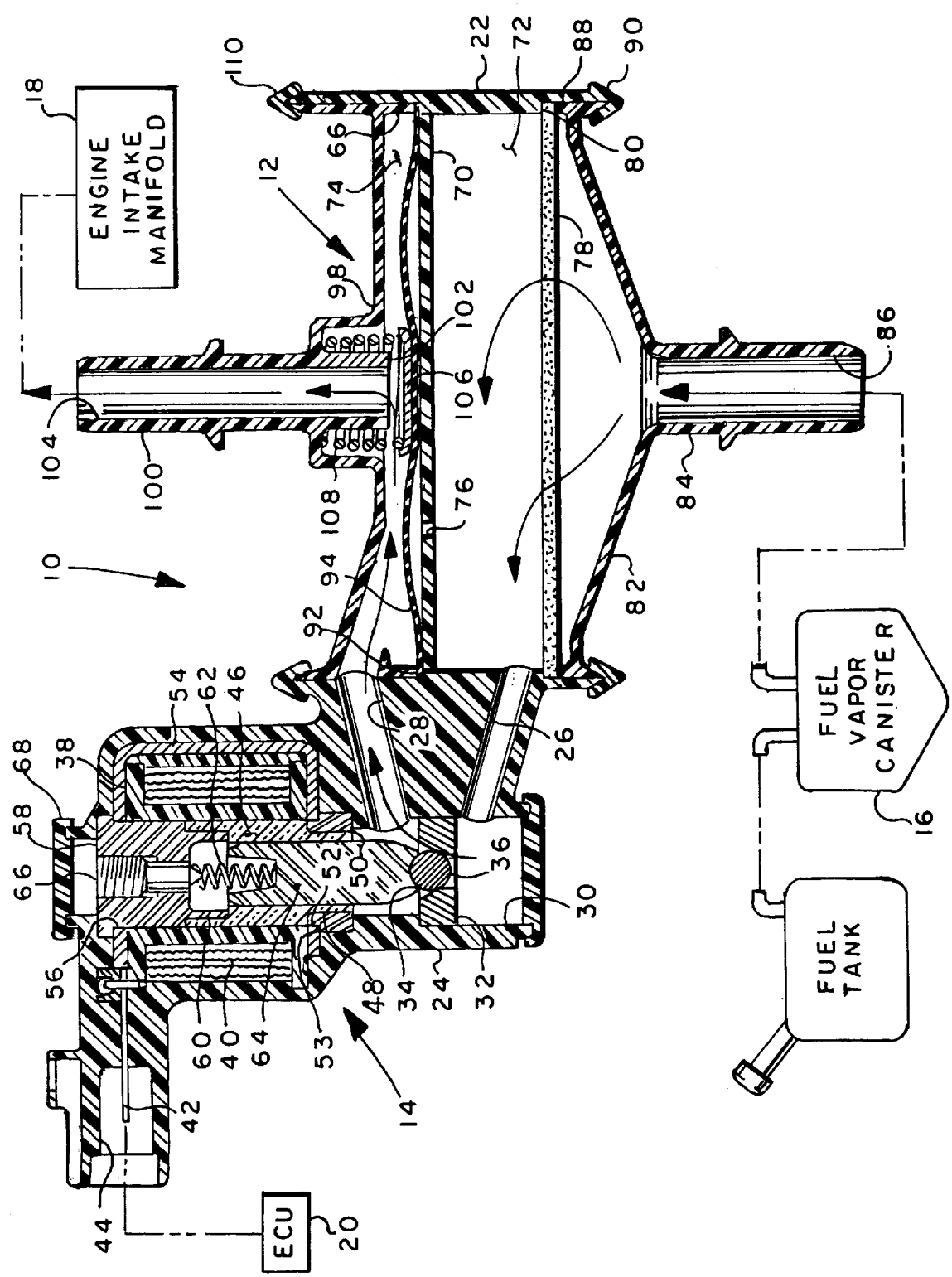

WELDED CONSTRUCTION FOR FUEL VAPOR PURGE REGULATOR VALVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to devices for controlling the introduction of fuel tank vapor into the air inlet of an internal combustion engine to prevent escape of the fuel tank vapors into the atmosphere. Recently legislated standards for the amount of permissible fuel vapor emissions from unburned fuel have required the complete closure of engine fuel supply systems utilizing volatile fuel.

In particular, the legislated standards for controlling the emission of unburned engine fuel in motor vehicles has required that the fuel vapor be stored and contained during periods of engine inoperation and the storage vessel purged during engine operation. In typical motor vehicle systems, a carbon filled canister adsorbs the fuel vapors during periods of engine inoperation and the canister is purged by allowing the fuel vapors in the canister to enter the engine air intake or intake manifold during engine operation.

However, it is necessary to control the flow of such stored fuel vapor to the engine intake manifold in order to prevent overly rich combustion in the engine which would in turn produce unacceptable emissions of products of the engine combustion or rough engine operation and stalling.

Currently, motor vehicles, particularly light trucks and passenger vehicles employ electrically operated fuel injectors which are controlled by an electronic control unit (ECU) which receives signals from sensors measuring the engine operating parameters, including the chemical composition of the engine exhaust. It has thus been desired to incorporate control of the fuel vapor purge with the electronic control of the engine via the ECU.

In earlier fuel vapor purge systems, a solenoid operated valve Controlled atmospheric bleed to a vacuum signal from the engine intake manifold to provide a reference pressure for a pressure regulator valve. This technique has the drawback of creating an atmospheric vent flow to the intake manifold and vacuum loss in the manifold.

More recently it has been proposed to control the flow from the vapor canister to the engine intake manifold by means of a pressure regulator with a solenoid operated valve controlling vapor flow from the canister to the inlet of the pressure regulator in response to a control signal from the ECU. Such a device and control technique is shown and described in the co-pending application of Daniel DeLand and Charles Detweiler entitled "Fuel Vapor Purge Control", Ser. No. 08/949,106, Filed Oct. 10, 1997 and assigned to the assignee of the present invention. The latter device utilizes an elastomeric diaphragm for operating the pressure regulator valve and has the solenoid operated valve attached to the regulator body and the solenoid operated valve is potted to control flow around the diaphragm. Typically, diaphragm operated pressure regulator valves are constructed in a manner so as to have the diaphragm periphery exposed to the atmosphere. In such constructions, where the diaphragm is formed of materials suitable for the extremes of temperature encountered in vehicle service, problems have been encountered with migration of the fuel vapor to the edges and evaporation to the atmosphere.

In addition, the aforesaid type fuel vapor purge control valve assemblies have required a separate in-line filter between the regulator valve assembly and the fuel canister to prevent carbon particles from the canister and other foreign material from entering the regulator valve and causing malfunction of the valve such as by valve seat contamination.

Accordingly, it has been desired to provide an electrically controlled pressure regulating fuel vapor purge control valve which is sealed sufficiently to prevent migration and escape of fuel vapor to the atmosphere, through the diaphragm is resistant to entrance and entrapment of foreign particles, is easy to assemble and calibrate, reliable in extended service, and is low in manufacturing costs.

BRIEF SUMMARY OF THE INVENTION

The present invention provides a solution to the above-described problem by a unique design and construction for the regulator valve housing wherein the housing of a fuel vapor canister purge valve assembly for the regulator diaphragm is preferably formed integrally with the body for the solenoid operated diaphragm by-pass valve. The diaphragm is sealed in a recess in the regulator valve housing by a cap forming the outlet port and seat for the pressure regulator valve; and, the cap is sealed to the body by weldment of a ring thereby completely enclosing the diaphragm. The inlet side of the pressure regulator valve is closed by a cap having the vapor inlet fitting formed integrally thereon and likewise sealed to the regulator housing over a filter by weldment of a ring. In one embodiment the weldment is performed ultrasonically; and, alternatively the weldment is performed frictionally by spin welding of the ring over the periphery of the housing and cap.

The present invention thus provides a very simple construction for the pressure regulator housing of a fuel vapor purge valve assembly and has the solenoid operated valve body formed integrally therewith and the housing sealed on opposite sides of the diaphragm by caps having the connector fittings integral therewith and sealed by weldment of a ring.

BRIEF DESCRIPTION OF THE DRAWING

The sole FIGURE of the drawing comprises a cross-section through the plane of symmetry of the valve assembly of the present invention and is a pictorial representation of the valve employed in a fuel vapor purge system for a motor vehicle.

DETAILED DESCRIPTION OF THE INVENTION

Referring the drawing, the valve assembly of the present invention is indicated generally at 10 and has a pressure regulator valve indicated generally at 12 and a solenoid operated valve indicated generally at 14 attached thereto, the assembly 10 being operative to control flow between a fuel vapor canister 16 and an engine intake manifold 18. The solenoid operated valve 14 is intended to be controlled by an electronic control unit (ECU) such as the type employed in a motor vehicle for controlling operation of the engine fuel injectors.

The pressure regulator valve assembly 12 has a shell or housing 22 which has a generally hollow cylindrical configuration with the body 24 of the solenoid valve 14 formed preferably integrally therewith as one piece and defining an inlet passage 26 for valve 14 and an outlet passage 28 which communicates with the interior of the housing 22.

The passages 26, 28 in valve body 24 communicate with a bore 30 formed on the valve body 24. Bore 30 has an annular member 32 disposed therein axially intermediate the passages 26, 28; and, member 32 defines thereon a valve seat 34 upon which is seated a preferably spherical valving member 36.

The valve 14 includes a coil bobbin 38 upon which is wound a coil 40 of electrically conductive material such as magnet wire. The coil 40 has its ends each terminating on an electrical connector terminal, one of which is illustrated and denoted by reference numeral 42 and which extends into a receptacle shell portion 44 formed in the body 24. The electrical terminals such as terminal 42 are, in a typical canister purge system, connected to the ECU 20.

The coil bobbin 38 has disposed centrally therein a non-magnetic armature guide member 46 which has the lower end thereof reduced in diameter as denoted by reference numeral 48 to be registered in the inner periphery of a ferromagnetic flux ring 50.

Ring 50 has a shoulder 53 formed thereon which is registered in an aperture 52 formed in a generally C-shaped ferromagnetic pole frame 54 which passes around the coil 40. The upper flange of coil frame 54 has an aperture 56 formed therein through which is received a ferromagnetic pole piece or flux collector 58 which is registered against the armature guide 46 and piloted therein by a reduced diameter portion 60.

A ferromagnetic armature member 64 is slidably received in the guide member 46 with the lower end thereof registered against valve member 36. The upper end of armature 64 has the lower end of a spring 62 registered there against; and, the upper end of the spring 62 is registered against the under surface of an adjustment plug 66 threadedly engaged in the pole piece 58 for adjusting the preload of the spring 62 upon the armature 64 to produce the desired flow for a given current in coil 40.

Once the preload on the spring has been adjusted by rotating plug 66, the upper end of the body is sealed by a cap 68 secured thereto in any convenient manner as, for example, by weldment.

In operation, upon receipt of an electrical signal from the ECU, current flow in coil 40 creates magnetic forces on armature 64 causing the armature to be raised against the force of spring 62 to permit opening of the valve member 36 on seat 34 to permit flow between passage 26 and passage 28 in the valve body.

The regulator housing 22 has a partition or wall 70 formed thereacross which forms a first cavity or chamber 72 which communicates with the passage 26. The opposite side of wall 70 forms a second chamber 74 which communicates with the passage 28. A bleed orifice 76 is formed through the wall 70 to permit dampened flow therethrough for pressure equalization on opposite sides of the wall 70.

A layer of suitable porous filter material 78 is disposed in housing 22 and registered on an annular shoulder 80 formed therearound and secured thereon by a cover or closure 82.

Closure 82 has an inlet fitting 84 formed thereon with a passage 86 therethrough communicating with chamber 72. Fitting 86 is, in a typical fuel vapor canister purge system connected to the vapor canister 16. The lower periphery of the cylindrical wall of housing 22 and a corresponding cylindrical wall portion 88 of the cover 82 have a ring, 90 received thereover which is commonly secured thereto for sealing therebetween by weldment. In one embodiment the weldment may be performed ultrasonically and alternatively in another embodiment frictionally by spinning the ring 90 with respect to the housing 22.

A second annular shoulder 92 is formed in the cylindrical wall of housing 22 at the upper surface of wall 70 and has received thereon in closely fitting arrangement the periphery of a flexible elastomeric diaphragm 94 which has the periphery thereof retained and compressed by the cylindrical wall portion 96 of a cover 98. Cover 98 has an inlet fitting 100 formed externally thereon and an annular valve seat 102 formed on the under surface thereof and extending into the chamber 74 which valve seat communicates with a passage 104 formed through the fitting 100.

Diaphragm 94 has a moveable valve member or plate 106 provided on the upper surface thereof and disposed thereon for relative movement with respect to the valve set 102. Valve member 106 is biased downwardly by the lower end of a spring 108 registered against plate 106 with the upper end of spring 108 registered against the under surface of cover 98.

The cylindrical wall 96 of cover 98 has a port 99 formed therein which is oriented to coincide with and communicate with the valve outlet passage 28 for permitting flow to chamber 74.

The cylindrical wall 96 of cover 98 closely interfits the inner periphery of the upper portion of housing cylindrical wall 22 and is retained therein by a ring 110 which is sealed thereover by weldment such as ultrasonic or spin welding to seal the chamber 74. It will be understood that during weldment the ring 110 is constrained by external means (not shown) to apply a downward load on the cylindrical wall 96 of cover 98 so as to compress the outer periphery of the diaphragm 94 onto shoulder 92 and seal the diaphragm in the regulator housing.

In operation, in the unenergized state with the engine inoperative, valve 14 is biased closed by spring 62 preventing fuel vapor from canister 16 from entering passage 28 and the chamber 74. Upon engine start up, the ECU opens valve 14 a desired amount to permit flow to chamber 74; and, the differential pressure between chamber 72 and 74 acts on the diaphragm 94 to move valve member 106 against the bias of spring 108 to maintain a desired pressure in the chamber 74. The valve 14 is controlled electrically by the ECU to maintain the desired amount of flow to the chamber 74.

In the presently preferred practice the assembly of the bobbin coil, C-frame, flux collector and pole piece along with the electrical terminals may be inserted as a mold insert and encapsulated with molded material in one operation to form the valve body 24 and the pressure regulator housing 22. The valve assembly of the present invention includes a built in self-contained filter which protects the solenoid operated valve 14 and the pressure regulator valve 12 from foreign particles. The valve assembly of the present invention thus provides for simplicity of construction and assembly with a minimum of parts and provides for complete sealing about the periphery of the diaphragm to prevent migration of vapors therethrough and escape to the atmosphere.

The valve of the assembly of the present invention is thus simple to assemble, reliable in service, and low in manufacturing costs.

Although the invention has hereinabove been described with respect to the illustrated embodiments, it will be understood that the invention is capable of modification and variation and is limited only by the following claims.

We claim:

1. A fuel vapor canister purge regulator assembly comprising:

(a) housing means having an inlet adapted for connection to a fuel vapor canister and an outlet adapted for connection to an engine induction air inlet; said housing means having first fluid pressure chamber communicating with said outlet and a second fluid pressure chamber communicating with said inlet and a pressure responsive means moveable in response to the pressure differential between said first and second fluid pressure chambers;

(b) a pressure regulator valve disposed for movement by said pressure responsive member for controlling the pressure at said outlet;

(c) electrically actuated valve means having an inlet ported to said second fluid pressure chamber and an outlet ported to said first fluid pressure chamber, said valve means operable to control flow from said second to said first chamber; and, (d) said housing means includes a first housing shell member defining a body for said valve means, a second housing shell member defining said outlet and disposed to seal said pressure responsive means in said first shell member wherein said first and second housing shell members are sealed by weldment.

2. The assembly defined in claim 1, wherein said pressure responsive means comprises a flexible diaphragm.

3. The assembly defined in claim 1, wherein said electrically actuated means includes a body formed integrally with said housing means.

4. The assembly defined in claim 1, wherein said valve means is electromagnetically actuated.

5. The assembly defined in claim 1, wherein said housing means includes a third shell member defining said inlet, wherein said third shell member is sealed to said first shell member by weldment.

6. A method of making a fuel vapor purge regulator assembly compressing:

(a) forming a first housing shell defining an outlet;

(b) forming a second housing shell defining a vapor inlet and a body with an inlet port and outlet port for an electrically actuated valve;

(c) disposing a pressure responsive diaphragm in said second shell and forming a fluid pressure chamber therewith;

(d) disposing said first shell over said diaphragm and sealing said diaphragm;

(e) welding said first shell to said second shell and sealing said pressure chamber; and, (f) disposing an electrically actuated valve on said body and controlling flow from said vapor inlet to said fluid chamber.

7. The method defined in claim 6, wherein said step of welding includes disposing a ring on the periphery of said first and second shell and welding said ring to the periphery of said first and second shell.

8. The method defined in claim 6, wherein said welding includes ultrasonic welding.

9. The method defined in claim 6, wherein said welding includes spin molding.

* * * * *